(12) United States Patent
Watanabe

(10) Patent No.: US 7,208,736 B2
(45) Date of Patent: Apr. 24, 2007

(54) INFRARED SENSOR DEVICE AND ITS MANUFACTURING METHOD

(75) Inventor: Kazuaki Watanabe, Nagoya (JP)

(73) Assignee: Denso Corporation, Kariya (JP)

(*) Notice: Subject to any disclaimer, the term of this patent is extended or adjusted under 35 U.S.C. 154(b) by 90 days.

(21) Appl. No.: 11/190,957

(22) Filed: Jul. 28, 2005

(65) Prior Publication Data

US 2006/0038129 A1     Feb. 23, 2006

(30) Foreign Application Priority Data

Aug. 4, 2004   (JP)   .............................. 2004-227827

(51) Int. Cl.
*G01J 5/00* (2006.01)
(52) U.S. Cl. ................. 250/338.1; 250/336.1
(58) Field of Classification Search ............. 250/338.1, 250/336.1
See application file for complete search history.

(56) References Cited

U.S. PATENT DOCUMENTS 7,122,797 B2 * 10/2006 Guo et al. ................ 250/338.1

FOREIGN PATENT DOCUMENTS

JP        2000298063 A  * 10/2000
JP        A-2003-270047    9/2003

* cited by examiner

*Primary Examiner*—David Porta
*Assistant Examiner*—Christine Sung
(74) *Attorney, Agent, or Firm*—Posz Law Group, PLC

(57) ABSTRACT

An infrared sensor device includes an infrared sensor element in which a membrane is formed on a surface side of a substrate by forming a concave portion on a rear face side of the substrate, and electrodes for detection are arranged on the surface side of the substrate, and an infrared ray absorbing film for absorbing the energy of an infrared ray by receiving the infrared ray is arranged at the membrane on the rear face side of said substrate. The substrate is electrically connected to a circuit substrate through a bump in a state in which the surface side of the substrate is opposed to the circuit substrate.

5 Claims, 4 Drawing Sheets

US 7,208,736 B2

INFRARED SENSOR DEVICE AND ITS MANUFACTURING METHOD

CROSS REFERENCE TO RELATED APPLICATION

This application is based upon, claims the benefit of priority of, and incorporates by reference the contents of, Japanese Patent Application No. 2004-227827 filed on Aug. 4, 2004.

FIELD OF THE INVENTION

The present invention relates to an infrared sensor device in which an infrared sensor element arranging an infrared ray absorbing film in a membrane is mounted onto a circuit substrate.

BACKGROUND OF THE INVENTION

A conventional infrared sensor device includes an infrared sensor element and a circuit substrate for mounting this infrared sensor element is conventionally. In this device, a membrane as a thin wall portion is formed on the surface side of the substrate by forming a concave portion on the rear face side of the substrate. The infrared sensor element has an electrode for detection on the surface side of the substrate, and also has an infrared ray absorbing film in the membrane.

FIG. 8 is a view showing an entire schematic sectional construction of such a conventional infrared sensor device. FIG. 9 is a top view of the infrared sensor element 30 and the circuit substrate 20 in the infrared sensor device shown in this FIG. 8.

In the infrared sensor device shown in FIGS. 8 and 9, the concave portion 38 is formed from the rear face 31b side in the substrate 31 constructed by a silicon substrate, etc. in the infrared sensor element 30. Thus, the membrane 33 as a thin wall portion is formed on the surface 31a side of the substrate 31.

The unillustrated electrode for detection constructed by a thermocouple, etc. is formed on the surface 31a of the substrate 31. The infrared ray absorbing film 36 for absorbing the energy of an infrared ray by receiving the infrared ray is formed on this electrode for detection.

The infrared sensor element 30 is mounted onto the circuit substrate 20, and is adhered and fixed to the circuit substrate 20 through an adhesive 22 in a circumferential portion of the membrane 33 on the rear face 31b side of the substrate 31, i.e., in a thick wall portion. The surface 31a of the substrate 31 and the circuit substrate 20 in the infrared sensor element 30 are wired and electrically connected through a bonding wire 50.

Thus, the circuit substrate 20 laminating the infrared sensor element 30 therewith is mounted and fixed to a stem 10 through an adhesive 13. A cap 60 is attached to the stem 10 so as to protect this laminating body. An infrared ray transmitting filter 70 for transmitting only the infrared ray is arranged in this cap 60.

A lead pin 11 is arranged around the circuit substrate 20 in the stem 10. The circuit substrate 20 and the lead pin 11 are electrically connected through the bonding wire 50. Thus, the circuit substrate 20 and the exterior can be electrically connected through the lead pin 11.

[Patent Literature 1]
JP-A-2003-270047

In the conventional infrared sensor device, as mentioned above, the infrared sensor element 30 is adhered to the circuit substrate 20 through the above adhesive 22 in the circumferential portion of the membrane 33 on the rear face 31b side of the substrate 31.

In such a case, the space within the concave portion 38 located below the membrane 33 becomes a sealing space sealed by the adhesive 22 and interrupted from the exterior.

When such a sealing space is formed, the volume within this sealing space is expanded when heat is applied to the infrared sensor element 30, etc. As its result, there is a fear that the membrane 33 having comparatively small strength within the infrared sensor element 30 is broken.

Therefore, it is necessary to set a construction for partially arranging the adhesive 22 adhering the infrared sensor element 30 and the circuit substrate 20 (see the above patent literature 1), and arrange a hole of air extraction in the infrared sensor element 30 so as not to set the space within the concave portion 38 located below the membrane 33 to the sealing space. Therefore, it takes much time and labor to mount the infrared sensor element 30 to the circuit substrate 20.

Further, in the conventional infrared sensor device, as mentioned above, the surface 31a of the substrate 31 and the circuit substrate 20 in the infrared sensor element 30 are connected through the bonding wire 50.

Therefore, as shown in FIG. 9, it is necessary to secure a space for the wire bonding, i.e., a distance D required in the wire bonding. It is correspondingly difficult to make the circuit substrate 20 compact.

SUMMARY OF THE INVENTION

In view of the above problems, it is an object to realize a construction for easily and appropriately making a compact infrared sensor device in which the infrared sensor element arranging the infrared ray absorbing film in the membrane is mounted onto the circuit substrate.

To achieve the above object, an infrared sensor device includes an infrared sensor element in which a membrane as a thin wall portion is formed on the surface side of a substrate by forming a concave portion on the rear face side of the substrate, and electrodes for detection are arranged on the surface side of the substrate, and an infrared ray absorbing film for absorbing the energy of an infrared ray by receiving the infrared ray is arranged in the membrane, and a circuit substrate for mounting this infrared sensor element. The substrate is electrically connected to the circuit substrate through a bump in a state in which the surface side of the substrate is opposed to the circuit substrate, and the infrared ray absorbing film is arranged in the membrane on the rear face side of the substrate.

In accordance with this construction, the infrared sensor element and the circuit substrate are joined through the bump on the surface side of the substrate arranging the electrodes for detection therein. Therefore, no concave portion on the rear face side of the substrate originally becomes a sealing space. Further, it is also not necessary to connect the infrared sensor element and the circuit substrate by wire bonding.

Therefore, no space for the wire bonding conventionally required is required so that the device can be correspondingly made compact. Further, no sealing space is formed in the joining portion between the infrared sensor element and the circuit substrate by the clearance between the bumps. Accordingly, a compact and unsealing structure can be simply realized.

However, when the infrared ray absorbing film is arranged on the surface side of the substrate arranging the electrode for detection therein as in the conventional case, no infrared ray is directly irradiated to the infrared ray absorbing film. Therefore, the absorbing degree of infrared ray energy is greatly reduced and a reduction in sensitivity is caused.

With respect to this point, the infrared ray absorbing film is arranged in the membrane on the rear face side of the substrate. Thus, the infrared ray is directly irradiated to the infrared ray absorbing film so that preferable sensitivity can be maintained.

Accordingly, it becomes possible to realize a construction for easily and appropriately making it compact in the infrared sensor device in which the infrared sensor element arranging the infrared ray absorbing film in the membrane is mounted onto the circuit substrate.

Here, the infrared ray absorbing film is also arranged in the membrane on the surface side of the substrate in the infrared sensor device.

The infrared ray is transmitted through the membrane from the rear face side of the substrate, and is slightly transmitted onto the surface side. However, the energy of the infrared ray transmitted through such a membrane can be also absorbed by the infrared ray absorbing film arranged on the surface side of the substrate. Therefore, sensitivity can be further improved.

Further, an infrared ray reflecting film for reflecting the infrared ray is arranged in a part opposed to the membrane in the circuit substrate in the infrared sensor device.

As mentioned above, the infrared ray is slightly transmitted from the rear face side of the substrate to the surface side. However, the infrared ray transmitted through such a membrane can be again reflected to the sides of the infrared ray absorbing film and the membrane by the infrared ray reflecting film. Accordingly, the absorption efficiency of the infrared ray energy of the infrared ray absorbing film is preferably improved.

In a method for manufacturing the infrared sensor device, the membrane is formed on the surface side of the substrate by forming the concave portion on the rear face side of the substrate, and the infrared ray absorbing film is then formed in the membrane on the rear face side of the substrate by an ink jet method.

The rear face of the substrate has an irregular shape with respect to the membrane as the bottom portion of the concave portion on the rear face side of the substrate. Therefore, it is difficult to form the infrared ray absorbing film by the normal lift-off method and the screen printing method. In contrast to this, the infrared ray absorbing film can be easily formed if the ink jet method is used as in the present manufacture method.

BRIEF DESCRIPTION OF THE DRAWINGS

The above and other objects, features and advantages will become more apparent from the following detailed description made with reference to the accompanying drawings. In the drawings.

DESCRIPTION OF THE PREFERRED EMBODIMENTS

Figure 1:
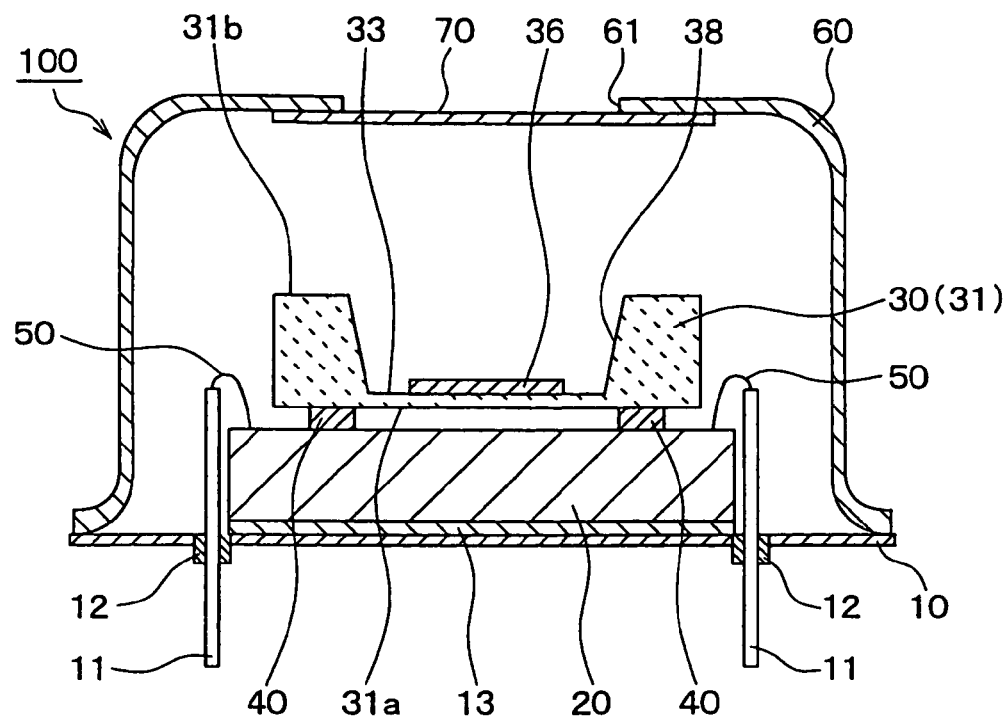
FIG. 1 is a view of the entire schematic section of an infrared sensor device in accordance with a first embodiment.

Various embodiments will be explained based on the drawings. In each of the following embodiments, portions identical with or equal to each other are designated by the same reference numerals in the drawings to simplify the explanation.

(First Embodiment)

Figure 2:
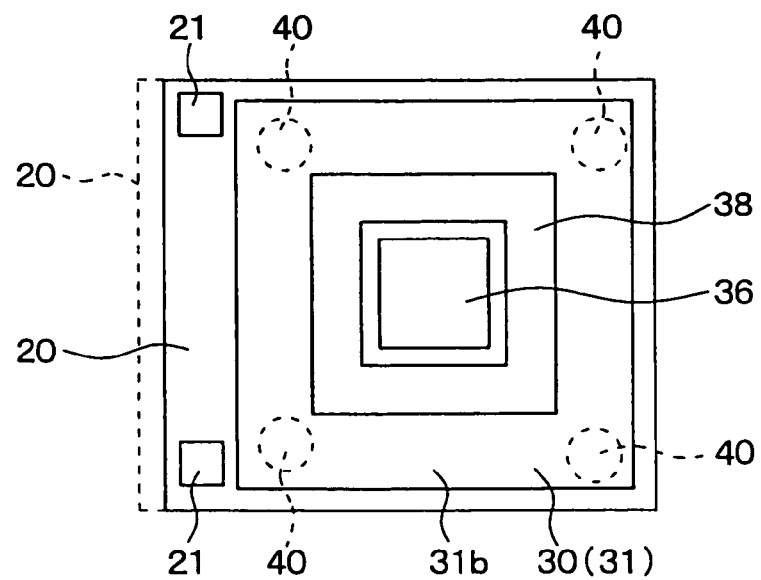
FIG. 2 is a top view of an infrared sensor element and a circuit substrate in the infrared sensor device shown in FIG. 1.

FIG. 1 is a view showing the entire schematic sectional construction of an infrared sensor device 100 in accordance with a first embodiment. FIG. 2 is a top view of an infrared sensor element 30 and a circuit substrate 20 in the infrared sensor device 100 shown in this FIG. 1.

Figure 3:
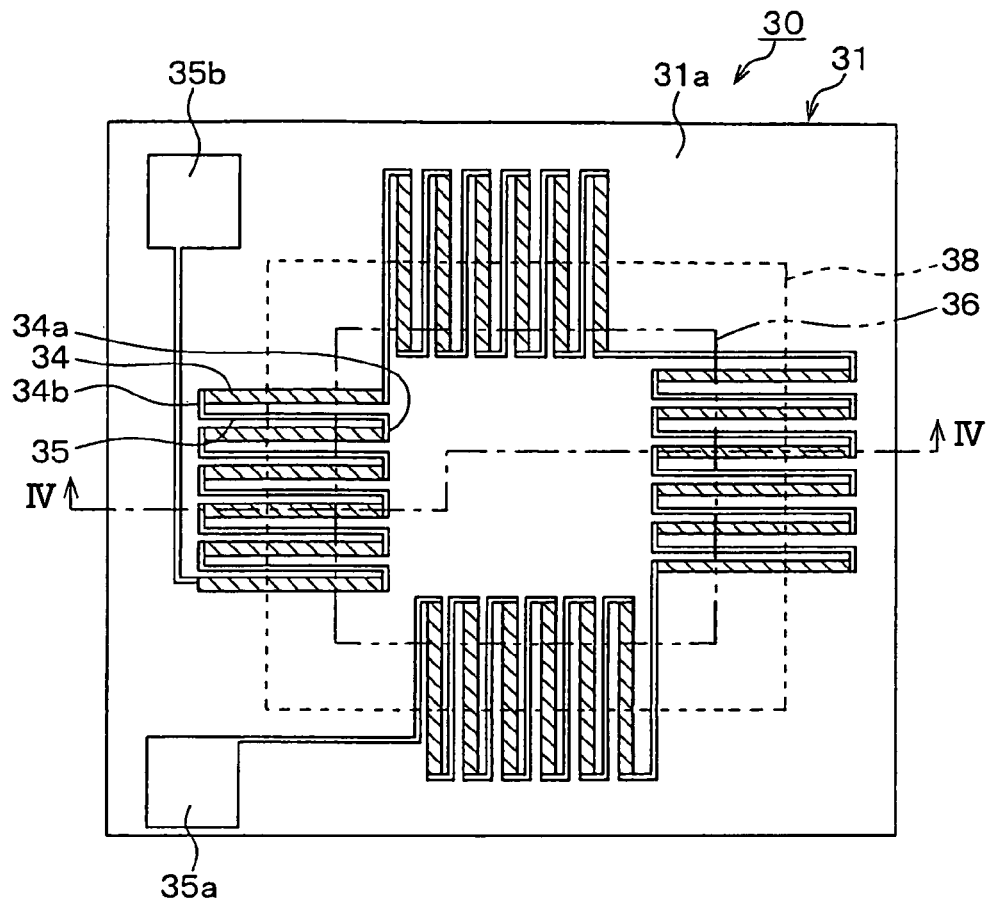
FIG. 3 is a schematic plan view of the infrared sensor element in the infrared sensor device shown in FIG. 1.
Figure 4:
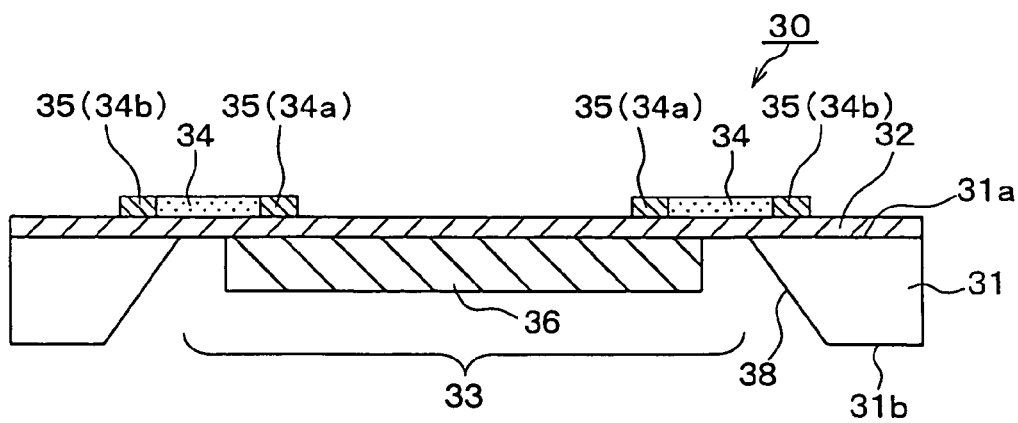
FIG. 4 is a typical sectional view of the infrared sensor element along line IV—IV of FIG. 3.

FIG. 3 is a view showing a schematic planar construction of the infrared sensor element 30 in the infrared sensor device 100 of this embodiment mode. FIG. 4 is a typical sectional view of the infrared sensor element 30 along line IV—IV within FIG. 3.

Hatching within FIG. 3 is for easily discriminating each portion, and does not show a section. In FIGS. 3 and 4, the thicknesses of respective films, the sizes of wirings, etc. are shown so as to be more or less different from each other.

In the infrared sensor device 100 shown in FIG. 1, a stem 10 is formed by cutting processing, press working of a metallic plate, etc. A circuit substrate 20 constructed by a printed board: a ceramic substrate, etc. is mounted and fixed onto one face of this stem 10 through an adhesive 13 constructed by a silicon system adhesive, etc.

An infrared sensor element 30 for detecting an infrared ray is mounted onto one face of this circuit substrate 20. The circuit substrate 20 plays a role in which a detecting signal from this infrared sensor element 30 is processed, etc. For example, the circuit substrate 20 is a circuit chip in which an element such as a transistor is formed in a silicon chip by a semiconductor process.

This infrared sensor element 30 is an infrared sensor element of a thermopile type utilizing electromotive force of plural thermocouples, and is formed with a substrate 31 as a main body.

Here, in FIG. 1 (FIG. 4), the lower face (upper face in FIG. 4) of the substrate 31 of the infrared sensor element 30 is the surface 31a of this substrate 31, and the upper face (lower face in FIG. 4) of the substrate 31 is the rear face 31b of this substrate 31.

The construction of the infrared sensor element 30 in this infrared sensor device 100, etc. will next be described mainly with reference to FIGS. 3 and 4.

As shown in this FIG. 3, a semiconductor substrate of silicon, etc. can be adopted as the substrate 31 in the infrared sensor element 30. More concretely, in this example, a silicon substrate (a silicon chip having a rectangular plate shape in this example) 31 having planes (100) and (110) in the planar azimuth of a principal plane is adopted as the substrate 31.

In this silicon substrate 31, an element portion required in sensing is formed by laminating each of various wirings and films, etc. on the surface 31*a* side of this silicon substrate 31. A concave portion 38 is formed by performing wet etching from the rear face 31*b* side of the silicon substrate 31.

Thus, a membrane 33 as a thin wall portion is formed on the surface 31*a* side of the silicon substrate 31. A circumferential portion of the membrane 33 in the silicon substrate 31 is set to a thick wall portion thicker than the membrane 33. In FIG. 3, the outer shape of the concave portion 38 is shown by a one-dotted chain line.

As shown in FIG. 4, an insulating thin film 32 constructed by a silicon nitride film, a silicon oxide film, etc. formed by the CVD method, the sputtering method, the evaporation method, etc. is formed approximately in an entire area including the upper portion of a cavity portion 38 on the surface 31*a* of this silicon substrate 31.

Namely, a portion of the silicon substrate 31 except for the concave portion 38 is a thick wall portion (e.g., about 400 μm in thickness). A portion of the insulating thin film 32 located on the concave portion 38 on the surface 31*a* of the silicon substrate 31 is a thin wall portion (e.g., about 2 μm in thickness), i.e., is constructed as the above membrane 33.

Plural polysilicon wirings (illustrated by slanting line hatching within FIG. 3) 34 constructed by polysilicon formed as a film by the CVD method, etc. and plural aluminum wirings 35 constructed by aluminum formed by the sputtering method, the evaporation method, etc. are respectively formed in a radial shape over the thick wall portion of the silicon substrate 31 outside the membrane 33 from the central portion of the membrane 33 on this insulating thin film 32.

An interlayer insulating film constructed by $SiO_2$, etc. is actually formed on the polysilicon wiring 34 and the insulating thin film 32 in which no polysilicon wiring 34 is formed although this interlayer insulating film is omitted in FIG. 4.

The aluminum wiring 35 is formed on this unillustrated interlayer insulating film. End portions of each polysilicon wiring 34 are connected through an opening portion (contact hole) formed in this interlayer insulating film.

Thus, the plural polysilicon wirings 34 and the plural aluminum wirings 35 are connected in series and constitute thermocouples 34, 35 of the infrared sensor element. In this example, as shown in FIG. 3, these thermocouples 34, 35 have a returning shape returned plural times.

Each of the plural returning portions 34*a*, 34*b* in these thermocouples 34, 35 becomes a joining portion of both the wirings 34, 35. Electromotive force is generated by the Seebeck effect in the joining portion of these different kinds of materials.

As shown in FIG. 3, both aluminum pads 35*a*, 35*b* electrically connected to the exterior by a bonding wire, etc. are conducted to the aluminum wiring 35 of both end portions of the thermocouples 34, 35.

The returning portion 34*a* located on the membrane 33 becomes a warm contact portion, and the returning portion 34*b* located in the thick wall portion of the silicon substrate 31 outside the membrane 33 becomes a cold contact portion. The voltage of the thermocouples 34, 35 based on the temperature difference between both the contact portions 34*a* and 34*b* is outputted between both the above aluminum pads 35*a* and 35*b*.

Namely, two wirings constructed by the polysilicon wiring 34 and the aluminum wiring 35 adjacently connected in series are constructed as one thermocouple. In the respective thermocouples 34, 35, the warm contact portion 34*a* is formed on the membrane 33, and the cold contact portion 34*b* is formed outside (thick wall portion) of the membrane 33 on the silicon substrate 31.

In this example, a plurality of such thermocouples 34, 35 are connected in series so as to increase an output, i.e., a voltage signal. Thus, the thermocouples 34, 35 are constructed as electrodes 34, 35 for detection in this infrared sensor element 30.

As shown in FIGS. 1 to 4 as an independent construction of this embodiment mode, an infrared ray absorbing film 36 is arranged in the membrane 33 on the rear face 31*b* side of the silicon substrate 31 in the infrared sensor element 30.

The infrared ray absorbing film is conventionally arranged on the surface 31*a* side of the silicon substrate 31 in which the electrodes 34, 35 for detection are arranged. However, conversely to this arrangement, the infrared ray absorbing film 36 is arranged on the rear face 31*b* side of the silicon substrate 31 in this embodiment mode.

Here, the infrared ray absorbing film 36 is separated from an outer circumferential end portion of the membrane 33 and is located inside the membrane 33. In FIG. 3, the outer shape of the infrared ray absorbing film 36 is shown by a broken line.

This infrared ray absorbing film 36 is arranged to absorb an infrared ray and efficiently raise the temperature of the warm contact portion. In this embodiment mode, the infrared ray absorbing film 36 is arranged on the rear face 31*b* of the silicon substrate 31 on the side opposed to the electrodes 34, 35 for detection, but heat from the infrared ray absorbing film 36 is sufficiently transmitted to the surface 31*a* side of the substrate 31 by the action of the membrane 33.

In such an infrared ray absorbing film 36, for example, carbon (C) is included in polyester resin, and this material is coated, burned and solidified by the ink jet method, the lift-off method, the screen printing method, etc. described later.

In the infrared sensor element 30 having such a construction, the warm contact portion 34*a* located on the membrane 33 of small heat capacity has a heat sinking property smaller than that of the cold contact portion 34*b* located on the thick wall portion of large heat capacity. Namely, the thick wall portion of the silicon substrate 31 fulfills the function of a heat sink.

When the infrared ray is irradiated from a measured object such as a human body, etc., and is received on the surface 31*a* side of the silicon substrate 31, the infrared ray is absorbed into the infrared ray absorbing film 36 and a temperature rise is caused. As its result, the temperature of the returning portion (warm contact portion) 34*a* covered with the infrared ray absorbing film 36 rises.

In the returning portion (cold contact portion) 34*b* located on the thick wall portion of the silicon substrate 31, no temperature rise is almost caused since the silicon substrate 31 becomes a heat sink. As a result, the temperature of the warm contact portion 34*a* is higher than that of the cold contact portion 34*b* so that a temperature difference is caused between both the contact portions. Therefore, electromotive force is generated by the Seebeck effect.

The infrared ray can be detected by outputting a sum total $V_{out}$ (thermopile output, sensor output) of the voltages of the plural thermocouples 34, 35 according to the temperature difference between both the contact portions 34a and 34b from both the aluminum pads (sensor output terminals) 35a and 35b. The infrared ray detection in this infrared sensor element 30 can be performed by voltage signals from the thermocouples 34, 35 as the electrodes for detection.

The above infrared sensor element 30 can be manufactured by using a well known semiconductor manufacture technique with respect to a silicon wafer finally divisionally cut in a chip unit and formed as the above silicon substrate 31.

First, the insulating thin film 32, the thermocouples 34, 35, each pad, etc. are formed in each chip forming area of the above silicon wafer surface by using a film forming technique of the CVD method, the sputtering method, the evaporation method, etc., and a patterning technique utilizing the photolithograph method, etc.

Thereafter, the concave portion 38 is formed and the membrane 33 is formed by performing wet etching, e.g., anisotropic etching using KOH (potassium hydroxide), etc. from the rear face side of the silicon wafer.

Thereafter, the infrared ray absorbing film 36 is formed by the above ink jet method, the lift-off method, the screen printing method, etc. from the rear face side of the silicon wafer, and the above silicon wafer is then divisionally cut in the chip unit by performing dicing cut, etc. Thus, plural infrared sensor elements 30 are completed as shown in the above FIGS. 3 and 4.

Here, the ink jet method is preferably adopted in the coating of the infrared ray absorbing film 36. For example, the above material provided by including carbon (C) in polyester resin as a raw material of the infrared ray absorbing film 36 is mixed with a solvent. This solution is used and is coated by the ink jet method, and is burned and solidified.

Namely, in this embodiment mode, the membrane 33 is formed on the surface 31a side of the silicon substrate 31 by forming the concave portion 38 on the rear face 31b side of the silicon substrate 31 in the manufacture of the infrared sensor element 30. Thereafter, the infrared ray absorbing film 36 is preferably formed in the membrane 33 on the rear face 31b side of the silicon substrate 31 by the ink jet method.

As shown in FIGS. 1 and 2, such an infrared sensor element 30 is electrically connected to the circuit substrate 20 through a bump 40 in a state in which the surface 31a side of the silicon substrate 31 is opposed to the circuit substrate 20. Here, a normal bump material such as solder and gold can be adopted in the bump 40.

The bump 40 is electrically connected to both the aluminum pads 35a, 35b in the infrared sensor element 30 shown in FIG. 3. The bump 40 is arranged in a position in which no infrared sensor element 30 is inclined on the circuit substrate 20 on the surface 31a of the silicon substrate 31 except for both the aluminum pads 35a, 35b.

Here, as shown by a broken line in FIG. 2, four bumps 40 are arranged at four corners of the silicon substrate 31. Thus, the infrared sensor element 30 is supported at four points by the four bumps 40 on the circuit substrate 20. Therefore, the infrared sensor element 30 is horizontally arranged without the inclination.

As shown in FIG. 1, a lead pin 11 inserted into a through hole is formed in the stem 10, and the through hole extends through the stem 10 in the thickness direction. The portion between the lead pin 11 and the stem 10 in this through hole is sealed by a hermetic glass 12.

An electrode 21 (see FIG. 2) of the circuit substrate 20 and the lead pin 11 on the upper face side of the stem 10 are wired by the bonding wire 50 constructed by gold, aluminum, etc., and are electrically connected. The lead pin 11 is electrically connected to the exterior on the lower face side of the stem 10.

Thus, after a voltage signal from the infrared sensor element 30 is subjected to processing of amplification, an adjustment, etc. in the circuit substrate 20, the voltage signal can be output from the lead pin 11 to the exterior.

As shown in FIG. 1, a cap 60 constructed by a metal, resin, ceramic, etc. is arranged on one face of the stem 10. An opening portion 61 is formed in a part opposed to the membrane 33 of the infrared sensor element 30 in this cap 60.

This opening portion 61 is blocked by an infrared ray transmitting filter 70 for selectively transmitting the infrared ray. This infrared ray transmitting filter 70 is constructed by a monocrystal body of silicon, germanium, etc. or ceramics transparent with respect to the infrared ray.

Such a cap 60 is fixed to the stem 10 by welding, adhesion, etc., and nitrogen and an inert gas absorbing no infrared ray are sealed within the cap 60. The circuit substrate 20 and the infrared sensor element 30 are airtightly sealed by this cap 60.

In such an infrared sensor device 100, the infrared ray transmitted through the infrared ray transmitting filter 70 and incident into the cap 60 is received by the infrared sensor element 30.

The energy of the received infrared ray is converted into a voltage signal by the infrared sensor element 30 as mentioned above. This voltage signal is processed by the circuit substrate 20, and is outputted from the lead pin 11 to the exterior.

For example, this infrared sensor device 100 can be manufactured as follows. The stem 10 having the lead pin 11 is prepared, and the circuit substrate 20 is adhered to this stem 10.

A structure provided by arranging the bump 40 in the infrared sensor element 30 manufactured by the above manufacture method is prepared, and is mounted onto one face of the circuit substrate 20. The infrared sensor element 30 and the circuit substrate 20 are then connected through the bump 40.

The infrared ray absorbing film 36 in the infrared sensor element 30 may be also formed after the connection to the circuit substrate 20. Namely, the infrared sensor element 30 in a state in which only the infrared ray absorbing film 36 is not formed, is bump-connected onto the circuit substrate 20 by upwardly setting the rear face 31b side of the silicon substrate 31. Thereafter, the infrared ray absorbing film 36 is formed within the concave portion 38 of the silicon substrate 31 by the ink jet method.

Thus, after the infrared sensor element 30 and the circuit substrate 20 are connected through the bump 40, the wire bonding is performed and the circuit substrate 20 and the lead pin 11 are connected by the bonding wire 50. The cap 60 is then welded to the stem 10 within the atmosphere of nitrogen. Thus, the above infrared sensor device 100 is completed.

In accordance with this embodiment mode, the infrared sensor device 100 composes:

an infrared sensor element 30 in which a membrane 33 as a thin wall portion is formed on the surface 31a side of a substrate 31 by forming a concave portion 38 on the rear face 31b side of the substrate 31, and electrodes 34, 35 for detection are arranged on the surface 31a side of the substrate 31, and an infrared ray absorbing film 36 for absorbing the energy of an infrared ray by receiving the infrared ray is arranged in the membrane 33; and a circuit substrate 20 for mounting this infrared sensor element 30;

wherein the substrate 31 is electrically connected to the circuit substrate 20 through a bump 40 in a state in which the surface 31a side of the substrate 31 is opposed to the circuit substrate 20, and the infrared ray absorbing film 36 is arranged in the membrane 33 on the rear face 31b side of the substrate 31.

In accordance with this construction, the infrared sensor element 30 and the circuit substrate 20 are joined through the bump 40 on the surface 31a side of the substrate 31 arranging the electrodes 34, 35 for detection therein. Therefore, no concave portion 38 on the rear face 31b side of the substrate 31 originally becomes a sealing space. Further, it is also not necessary to connect the infrared sensor element 30 and the circuit substrate 20 by the wire bonding.

Figure 9:
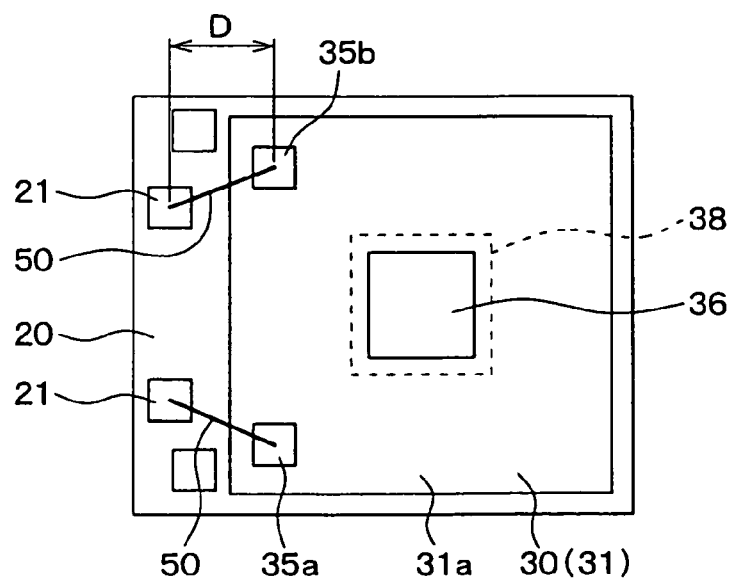
FIG. 9 is a top view of an infrared sensor element and a circuit substrate in the infrared sensor device shown in FIG. 8.

Therefore, no space for the wire bonding conventionally required is required so that the infrared sensor device can be correspondingly made compact. Concretely, it is not necessary to secure the distance D required in the wire bonding as shown in the above FIG. 9. Therefore, in the infrared sensor device 100 of this embodiment mode, the circuit substrate 20 can be made compact in comparison with the size of the conventional circuit substrate as shown by a broken line in FIG. 2.

Further, a sealing space is not formed by the clearance between the bumps 40 in a joining portion between the infrared sensor element 30 and the circuit substrate 20. Namely, in accordance with this embodiment mode, a compact and unsealing structure can be simply realized.

In this case, when the infrared ray absorbing film is arranged on the surface side of the substrate arranging the electrode for detection therein as in the conventional case, no infrared ray is directly irradiated to the infrared ray absorbing film. Therefore, the absorbing degree of infrared ray energy is greatly reduced so that a reduction in sensitivity is caused.

With respect to this point, in this embodiment mode, the infrared ray absorbing film 36 is also arranged in the membrane 33 on the rear face 31b side of the substrate 31. Therefore, the infrared ray is directly irradiated to the infrared ray absorbing film 36 so that preferable sensitivity can be maintained.

Accordingly, in accordance with this embodiment, it is possible to realize a construction for easily and appropriately making it compact in the infrared sensor device in which the infrared sensor element arranging the infrared ray absorbing film in the membrane is mounted onto the circuit substrate.

Further, in accordance with this embodiment, it is possible to provide a method for manufacturing the infrared sensor device 100 in which the membrane 33 is formed on the surface 31a side of the substrate 31 by forming the concave portion 38 on the rear face 31b side of the substrate 31, and the infrared ray absorbing film 36 is then formed in the membrane 33 on the rear face 31b side of the substrate 31 by the ink jet method.

The rear face 31b of the substrate 31 has an irregular shape with respect to the membrane 33 as the bottom portion of the concave portion 38 on the rear face 31b side of the substrate 31. Therefore, it is difficult to form the infrared ray absorbing film 36 by the normal lift-off method and the screen printing method. In contrast to this, the infrared ray absorbing film 36 can be also easily formed with respect to such an irregular face if the ink jet method is used as in this manufacture method.

Further, the surface roughness of the infrared ray absorbing film 36 can be set to be coarse by using the ink jet system. This is because the ink jet system can change the thickness in a fine range.

Figure 5A:
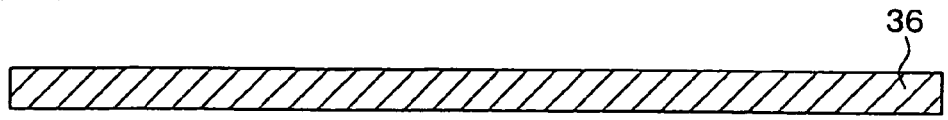
FIGS. 5A–5C are views showing various surface shapes in an infrared ray absorbing film.
Figure 5B:
Figure 5C:
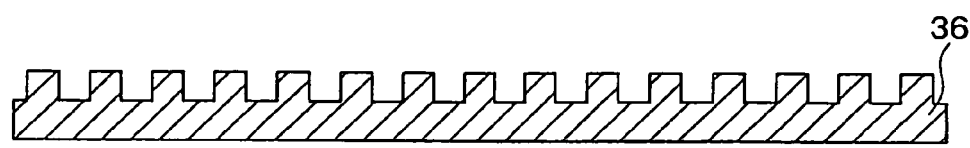

Concretely, as shown in FIGS. 5A–5C, the surface of the infrared ray absorbing film 36 can be set to the irregular shape instead of a plane. The reflectivity of the infrared ray is increased as the surface roughness of the infrared ray absorbing film 36 is reduced, i.e., the surface of the infrared ray absorbing film 36 is close to a mirror face (see FIG. 5A). Accordingly, the surface of the infrared ray absorbing film 36 becomes a factor for reducing sensitivity.

However, if the ink jet system is used, arbitrary irregularities (see FIGS. 5B and 5C) can be easily made on the surface of the infrared ray absorbing film 36, and the reflection of the infrared ray can be reduced. Thus, since sensitivity can be improved, it is effective to use the ink jet method.

(Second Embodiment Mode)

Figure 6:
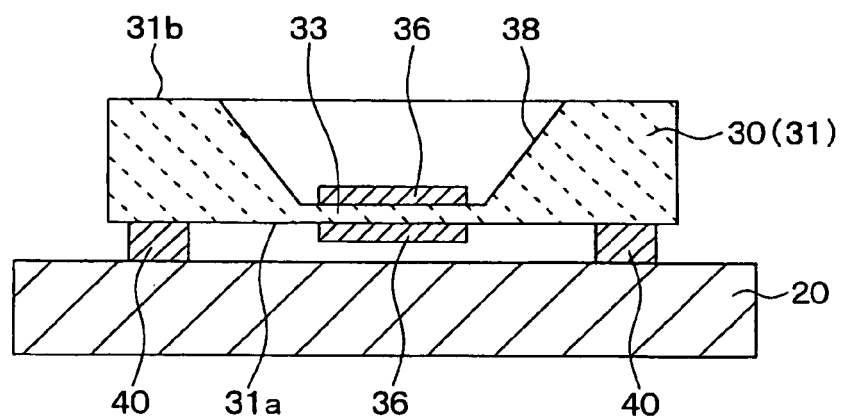
FIG. 6 is a schematic sectional view of a main portion of an infrared sensor device in accordance with a second embodiment.

FIG. 6 is a view showing the schematic sectional construction of a main portion of an infrared sensor device in accordance with a second embodiment, and is also a schematic sectional view of a circuit substrate 20 and an infrared sensor element 30. The different points from the above first embodiment mode will be centrally described.

As shown in FIG. 6, in the infrared sensor device of this embodiment mode, the infrared ray absorbing film 36 is also arranged in the membrane 33 on the surface side 31a of the silicon substrate 31 as well as the rear face 31b of the silicon substrate 31.

The infrared ray absorbing film 36 on the surface 31a side of this silicon substrate 31 is similar to that in the conventional infrared sensor element. As its forming method, coating, burning and solidification are performed by the ink jet method, the lift-off method, the screen printing method, etc.

In the case of the construction shown in FIG. 6, similar to the above first embodiment mode, the infrared ray absorbing film 36 is arranged in the membrane 33 on the rear face 31b side of the substrate 31. Thus, the infrared ray is directly irradiated to the infrared ray absorbing film 36 on the rear face 31b side of the substrate 31. Therefore, preferable sensitivity can be maintained.

Here, the infrared ray is transmitted through the membrane 33 from the rear face 31b side of the silicon substrate 31, and is slightly transmitted onto the surface 31a side. However, in accordance with this embodiment mode, the energy of the infrared ray transmitted through such a membrane 33 can be also absorbed by the infrared ray absorbing film 36 arranged on the surface 31a side of the silicon substrate 31. Therefore, sensitivity can be further improved.

In this embodiment mode, similar to the above first embodiment, it is possible to realize a construction for easily and appropriately making it compact in the infrared sensor device in which the infrared sensor element arranging the infrared ray absorbing film in the membrane is mounted onto the circuit substrate.

(Third Embodiment Mode)

Figure 7:
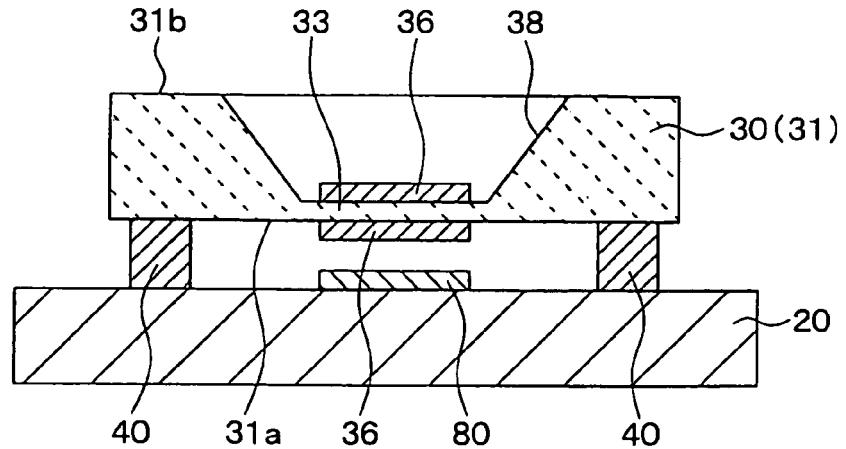
FIG. 7 is a schematic sectional view of a main portion of an infrared sensor device in accordance with a third embodiment.
Figure 8:
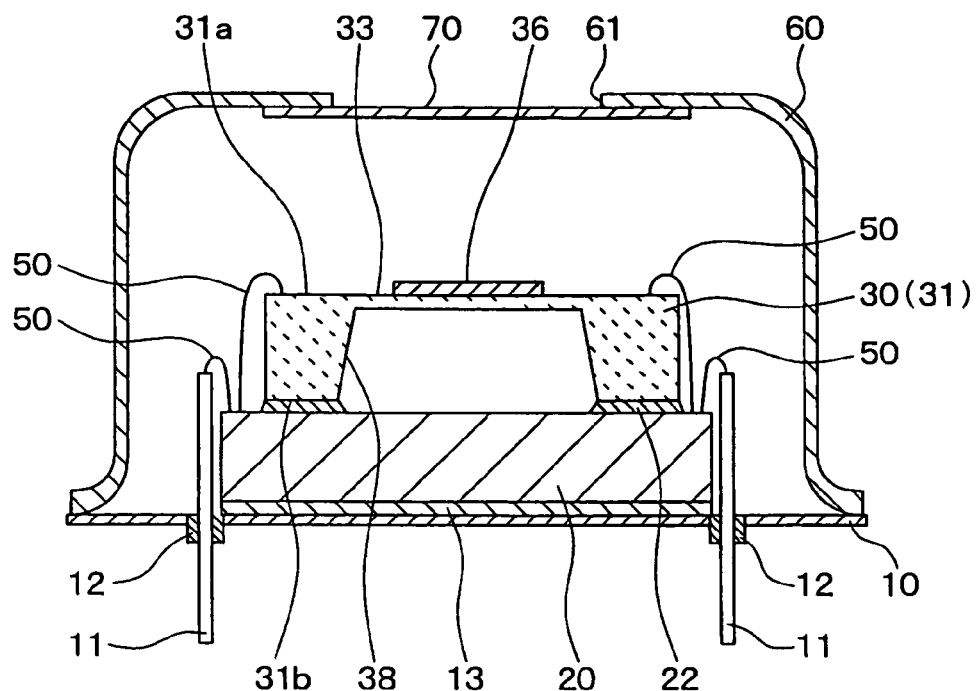
FIG. 8 is an entire schematic sectional view of a conventional infrared sensor device.

FIG. 7 is a view showing the schematic sectional construction of a main portion of an infrared sensor device in accordance with a third embodiment, and is also a schematic sectional view of a circuit substrate 20 and an infrared sensor element 30.

As shown in FIG. 7, in the infrared sensor device of this embodiment mode, similar to the device shown in the above FIG. 6, the infrared ray absorbing film 36 is also arranged in the membrane 33 on the surface 31a side as well as the rear face 31b of the silicon substrate 31. Operations and effects using this arrangement are similar to those in the above second embodiment mode.

Further, in the infrared sensor device of this embodiment mode, an infrared ray reflecting film 80 for reflecting the infrared ray is arranged in a part opposed to the membrane 33 in the circuit substrate 20. This infrared ray reflecting film 80 can be formed by using a film forming method such as the sputtering method, the CVD method, etc. from a material such as gold having high reflectivity.

As mentioned above, the infrared ray is transmitted through the membrane 33 from the rear face 31b side of the silicon substrate 31, and is slightly transmitted onto the surface 31a side. However, in accordance with this embodiment mode, the infrared ray transmitted through such a membrane 33 can be again reflected onto the sides of the infrared ray absorbing film 36 and the membrane 33 by the infrared ray reflecting film 80. Thus, the absorption efficiency of infrared ray energy of the infrared ray absorbing film 36 is preferably improved.

In this embodiment mode, similar to the above embodiment modes, it is possible to realize a construction for easily and appropriately making it compact in the infrared sensor device in which the infrared sensor element arranging the infrared ray absorbing film in the membrane is mounted onto the circuit substrate.

(Other Embodiment Modes)

The infrared sensor element is not limited to the infrared sensor element of the thermopile type as shown in the above embodiment modes, but any infrared sensor element may be also used if this infrared sensor element has a structure for forming the membrane and forming the infrared ray absorbing film by etching the rear face of the substrate. For example, the infrared sensor element of a bolometer type for detecting resistance may be also used.

The substrate constituting the infrared sensor element is not limited to the above silicon substrate, but a semiconductor substrate, for example, a ceramic substrate, etc. except for the semiconductor substrate may be also widely adopted.

Generally, the infrared sensor device composes:

an infrared sensor element in which a membrane is formed on the surface side of a substrate by forming a concave portion on the rear face side of the substrate, and electrodes for detection are arranged on the surface side of the substrate, and an infrared ray absorbing film is arranged in the membrane; and a circuit substrate for mounting this infrared sensor element;

wherein the substrate is electrically connected to the circuit substrate through a bump in a state in which the surface side of the substrate is opposed to the circuit substrate, and the infrared ray absorbing film is arranged in the membrane on the rear face side of the substrate. Portions except for this construction can be suitably designed and changed.

What is claimed is:

1. An infrared sensor device comprising:
an infrared sensor element in which a membrane as a thin wall portion is formed on a surface side of a substrate by forming a concave portion on a rear face side of the substrate, and electrodes for detection are arranged on the surface side of the substrate, and an infrared ray absorbing film for absorbing the energy of an infrared ray by receiving the infrared ray is arranged at the membrane on the rear face side of said substrate; and
a circuit substrate for mounting the infrared sensor element,
wherein the substrate is electrically connected to the circuit substrate through a bump in a state in which the surface side of the substrate is opposed to the circuit substrate.

2. The infrared sensor device according to claim 1, wherein the infrared ray absorbing film is also arranged at the membrane on the surface side of the substrate.

3. The infrared sensor device according to claim 1, wherein an infrared ray reflecting film for reflecting the infrared ray is arranged in a part opposed to the membrane on the circuit substrate.

4. An infrared sensor device comprising:
a sensor element comprising a membrane formed by a concave portion in a substrate, an infrared absorbing film disposed on a first surface of the substrate that is in the concave portion, a plurality of detection electrodes disposed on a second surface of the substrate that is not in the concave portion; and
a circuit substrate for mounting the infrared sensor element, wherein the substrate is electrically connected to the circuit substrate through a bump in a state in which the second surface of the substrate faces the circuit substrate.

5. A method for manufacturing an infrared sensor device, comprising:
Forming an infrared sensor element by
Forming a membrane on a surface side of a substrate by forming a concave portion on a rear face side of the substrate,
Arranging detection electrodes on the surface side of the substrate, and
Forming an infrared ray absorbing film on the membrane on the rear face side of the substrate by an ink jet method,
Mounting the infrared sensor element on a circuit substrate by
Arranging the surface side of the substrate to oppose the circuit substrate, and
Electrically connecting the substrate to the circuit substrate through a bump bond.

* * * * *